No. 683,252. Patented Sept. 24, 1901.
J. J. CRAWFORD.
PISTON PACKING FOR HYDRAULIC PRESSES.
(Application filed Mar. 11, 1901.)
(No Model.)
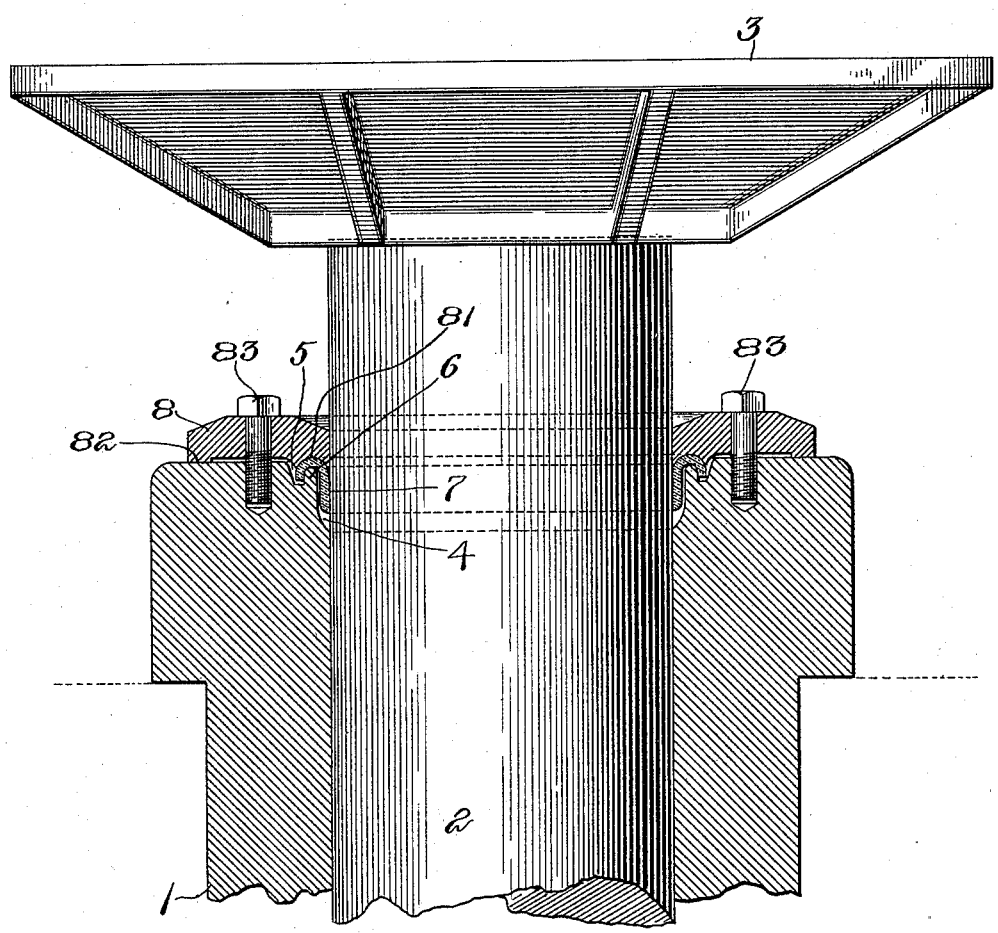
Witnesses:
Inventor:
John J. Crawford,
by Macleod, Calver & Randall
Attorneys.

UNITED STATES PATENT OFFICE.

JOHN J. CRAWFORD, OF WINCHESTER, MASSACHUSETTS.

PISTON-PACKING FOR HYDRAULIC PRESSES.

SPECIFICATION forming part of Letters Patent No. 683,252, dated September 24, 1901.

Application filed March 11, 1901. Serial No. 50,588. (No model.)

*To all whom it may concern:*

Be it known that I, JOHN J. CRAWFORD, a citizen of the United States, residing at Winchester, in the county of Middlesex, State of Massachusetts, have invented a certain new and useful Improvement in Piston-Packing for Hydraulic Presses, of which the following is a specification, reference being had therein to the accompanying drawing.

The accompanying drawing shows, partly in section and partly in elevation, a portion of a hydraulic press and in connection therewith an embodiment of my invention.

Having reference to the drawing, a portion of the cylinder of a hydraulic press is represented at 1, and a portion of the piston is shown at 2.

3 is the platen, which is applied to the upper end of the piston. The platen is detachably mounted on the said upper end of the piston, it being formed underneath with a recess or socket which receives the said end. This mode of connecting the parts enables the platen to be disconnected and removed by lifting it off the piston.

The seat for the packing is made by forming a shallow enlargement 4 of the bore of the cylinder at the upper end of the cylinder, and also an annular groove 5 in the upper end of the cylinder, leaving an upwardly-projecting annular rib 6 intervening between the said annular groove 5 and the recess which is constituted by the enlargement 4 of the bore of the cylinder. The top of annular rib 6 stands a little lower than the general level of the upper end of the cylinder.

7 designates the packing. It is formed of suitable material, usually leather, although I do not limit myself to the use of this precise material, since others may be employed in lieu thereof. The packing 7 is prepared for application to the press by being molded to the required form and to the proper shape to fit the cylinder and piston by means of pressure. It is U or J shaped in cross-section, as illustrated in the drawing. The recess or groove in the under side of the packing receives the annular rib 6 of the cylinder. The outer flange of the packing (herein the narrow flange) enters the annular groove 5 in the upper end of the cylinder, and the inner flange thereof (herein the wide flange) occupies the enlargement 4 of the bore of the cylinder. The packing preferably is in the form of a complete ring, molded to shape, as aforesaid, and when thus made it is applied by removing the platen from the upper end of the piston and slipping the packing-ring down into place over the piston, which latter is of uniform diameter throughout its upper portion.

For the purpose of securing the packing firmly in place I employ a cap 8 in the form of either an entire ring or of a number of segments together constituting a ring. Around the inner edge of the cap at its under side is formed a grooved bearing 81 to rest on the convex upper surface or crown of the packing and clamp the latter against the upper edge of the annular rib 6. This grooved bearing is shaped to receive and fit the rounded exterior of the top of the packing. In order that when the cap is applied it may be pressed firmly upon the packing and may be tightened up fully against the latter, so as to hold it tightly clamped against the rib 6, the under portion of the cap is removed at the outer side of the grooved bearing 81, except around the outer edge of the cap, where a narrow bearing-ring 82 is left, projecting slightly below the general surface of the cap. When the cap is formed in segments, this bearing-ring comes to rest upon the upper surface of the cylinder end; but when the cap is made in a complete ring this bearing-ring 82 just clears the upper end of the cylinder, so as to insure that the grooved bearing or seat shall make firm contact with the packing.

83 83 are screws by which the cap is attached to the upper end of the cylinder and tightened down upon the packing.

The inner flange of the packing is less in vertical height than the enlargement 4 of the bore of the cylinder, and consequently does not fill the lower portion of the said enlargement. The edge of said flange is reduced or beveled off at its outer side to facilitate the entrance of liquid under pressure behind the said flange of the packing. When liquid is pumped into the chamber of the cylinder for the purpose of operating the piston, the portion of liquid flowing outward between the piston and cylinder and reaching the enlargement 4 of the bore of the cylinder enters behind the lower edge of the said inner flange of the packing and operates to force said flange inward into close contact with the piston.

Ordinary packing usually wears out after a comparatively short period of use in a hydraulic press. This is due in part to the fact that in being applied it is not fitted properly to the piston, and hence is subjected to unequal and unnecessary wear, which results in speedily unfitting it for service. The length of life of ordinary packing therefore depends in great measure upon the skill and carefulness of the workman by whom it is applied. My improved molded packing cannot be applied improperly and in connection with my means of supporting and securing the same in place enables a hydraulic press to be packed or repacked with readiness and convenience very quickly by an ordinary workman.

My invention is not limited necessarily to use in connection with hydraulic presses, but is fitted for employment in other connections as well. In the case of presses of ordinary construction, in which the enlarged piston is formed with a head which would interfere with the operation of placing the packing in position from above, the application of the packing will be provided for by lifting the piston bodily above the cylinder and sustaining it in an elevated position while the operation of applying the packing is being performed.

What I claim is—

1. The combination with the piston, and the cylinder having the enlargement 4 of its bore, the annular groove 5, and the fixed intermediate annular rib, of the molded packing fitting over said rib having the outer flange occupying the said annular groove and the inner flange occupying the said enlargement, and the cap clamping said packing against the said rib, substantially as described.

2. The combination with the piston, and the cylinder having the enlargement 4 of its bore, the annular groove 5, and the fixed intermediate annular rib, of the molded packing fitting over the said rib having the outer flange occupying the said groove and the inner flange occupying the said enlargement, and the cap having the grooved seat engaging the crown of the packing and clamping the latter against the said rib, substantially as described.

3. The combination with the piston, and the cylinder having the enlargement 4 of its bore, the annular groove 5, and the fixed intermediate annular rib, of the molded packing fitting over the said rib having the outer flange occupying the said groove and the inner flange occupying the said enlargement, the segmental cap having the grooved seat engaging the crown of the packing and clamping the latter against the said rib, and also having the outer bearing-ring to rest upon the cylinder, and means to secure the cap in place, substantially as described.

In testimony whereof I affix my signature in presence of two witnesses.

JOHN J. CRAWFORD.

Witnesses:
CHAS. F. RANDALL,
ARTHUR F. RANDALL.